(12) United States Patent
Park et al.

(10) Patent No.: US 7,873,364 B2
(45) Date of Patent: Jan. 18, 2011

(54) APPARATUS AND METHOD FOR ACCOUNTING IN WIRELESS COMMUNICATION SYSTEM

(75) Inventors: Chul Park, Daejeon (KR); Chul-Sik Yoon, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc. (KR)

( * ) Notice: Subject to any disclaimer, the term of this patent is extended or adjusted under 35 U.S.C. 154(b) by 1064 days.

(21) Appl. No.: 11/636,873

(22) Filed: Dec. 11, 2006

(65) Prior Publication Data

US 2007/0155398 A1 Jul. 5, 2007

(30) Foreign Application Priority Data

Dec. 10, 2005 (KR) .............. 10-2005-0121351

(51) Int. Cl.
*H04W 72/00* (2009.01)

(52) U.S. Cl. .............. 455/450; 455/405; 455/406; 455/407; 455/408; 455/409

(58) Field of Classification Search ......... 455/405–409, 455/450

See application file for complete search history.

(56) References Cited

U.S. PATENT DOCUMENTS

| | | | | |
|---|---|---|---|---|
| 6,603,975 | B1 * | 8/2003 | Inouchi et al. ............. | 455/450 |
| 2002/0099848 | A1 | 7/2002 | Lee | |
| 2003/0072266 | A1 * | 4/2003 | Uesugi et al. .............. | 370/236 |
| 2003/0103520 | A1 * | 6/2003 | Chen et al. ................ | 370/444 |
| 2004/0179506 | A1 * | 9/2004 | Padovani et al. ........... | 370/342 |
| 2004/0203938 | A1 * | 10/2004 | Kulkarni .................... | 455/464 |
| 2004/0240410 | A1 * | 12/2004 | Hayashi et al. ............. | 370/329 |
| 2004/0258096 | A1 * | 12/2004 | Yoon et al. ................. | 370/498 |
| 2005/0026616 | A1 * | 2/2005 | Cavalli et al. .............. | 455/436 |
| 2005/0117539 | A1 * | 6/2005 | Song et al. ................. | 370/328 |
| 2005/0193310 | A1 * | 9/2005 | Obuchi et al. .............. | 714/752 |
| 2006/0015576 | A1 | 1/2006 | Seo et al. | |
| 2006/0193391 | A1 * | 8/2006 | Borran et al. .............. | 375/260 |

FOREIGN PATENT DOCUMENTS

| | | |
|---|---|---|
| JP | 2002-344664 | 11/2002 |
| KR | 1020020044201 | 6/2002 |
| KR | 1020040042190 | 5/2004 |
| KR | 1020050036132 | 4/2005 |
| KR | 10-2005-0090562 | 9/2005 |
| WO | WO 2005/084149 | 9/2005 |

* cited by examiner

*Primary Examiner*—Rafael Pérez-Gutiérrez
*Assistant Examiner*—Liton Miah
(74) *Attorney, Agent, or Firm*—The Farrell Law Firm, LLP

(57) ABSTRACT

The present invention relates to an accounting method and an accounting apparatus in a mobile communication system. The amount of radio resources and traffic used by a mobile terminal of each subscriber accessing a base station can be measured and analyzed without changing a structure of the mobile communication system. In addition, since a provider who does not own an IP network and thus uses a leased network of an existing provider can measure and analyze the amount of traffic used by a mobile terminal in the leased network regardless of an IP network of the existing provider, a more precise accounting reference can be provided to the corresponding provider.

8 Claims, 7 Drawing Sheets

APPARATUS AND METHOD FOR ACCOUNTING IN WIRELESS COMMUNICATION SYSTEM

PRIORITY

This application claims priority under 35 U.S.C. §119 to a Korean application filed in the Korean Intellectual Property office on Dec. 10, 2005 and allocated Serial No. 10-2005-0121351, the contents of which are incorporated herein by reference.

BACKGROUND OF THE INVENTION (a) Field of the Invention

The present invention relates to a mobile communication system, and more particularly, it relates to an apparatus for accounting calculation, and a method thereof.

(b) Description of the Related Art

In general, a portable Internet system, which is part of a mobile communication system, is defined based on the IEEE802.16-2004, the IEEE802.16e-2005, and the IEEE802.16-2004/Cor1-2005. In addition, the portable Internet system defines a mobile station, a base station, and a router for compatibility with a conventional public IP network, and enables a mobile station in a moving state to use an IP-based network service supporting mobility of the mobile station.

Although many accounting operation methods have been proposed for the mobile communication system that includes such a portable Internet system, an apparatus for classifying a resource use amount of each of a plurality of mobile stations accessing a base station into a radio resource use amount and a traffic service use amount, and measuring the radio resource use amount and the traffic service use amount by a base station so as to use the measured results as parameters for an accounting operation of each subscriber, and a method thereof, have not been proposed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an accounting apparatus and an accounting operation method having advantages of measuring the amount of radio resources and the amount of traffic services used by a mobile terminal of each subscriber and performing an accounting operation for each subscriber by using the measured results as parameters.

An exemplary apparatus according to one embodiment of the present invention calculates accounting of a mobile terminal of a subscriber accessing a base station. The apparatus includes a parameter information extractor, a parameter information calculator, and an accounting calculator. The parameter information extractor extracts parameter information for the accounting. The parameter information calculator calculates the amount of information for respective parameter information based on the extracted parameter information.

An exemplary method according to another embodiment of the present invention calculates accounting of a mobile terminal of a subscriber in a base station. The method includes: measuring a first parameter allocated to the mobile terminal accessing the base station based on transmission frame structure information transmitted to the mobile terminal, the first parameter including the amount of radio resources and the amount of traffic; measuring a retransmission traffic amount that is a second parameter based on a NACK message received from the mobile terminal or transmitted to the mobile terminal; and calculating accounting for resources used by the mobile terminal accessing the base station based on the first parameter and a second parameter.

DETAILED DESCRIPTION OF THE EMBODIMENTS

Figure 1:
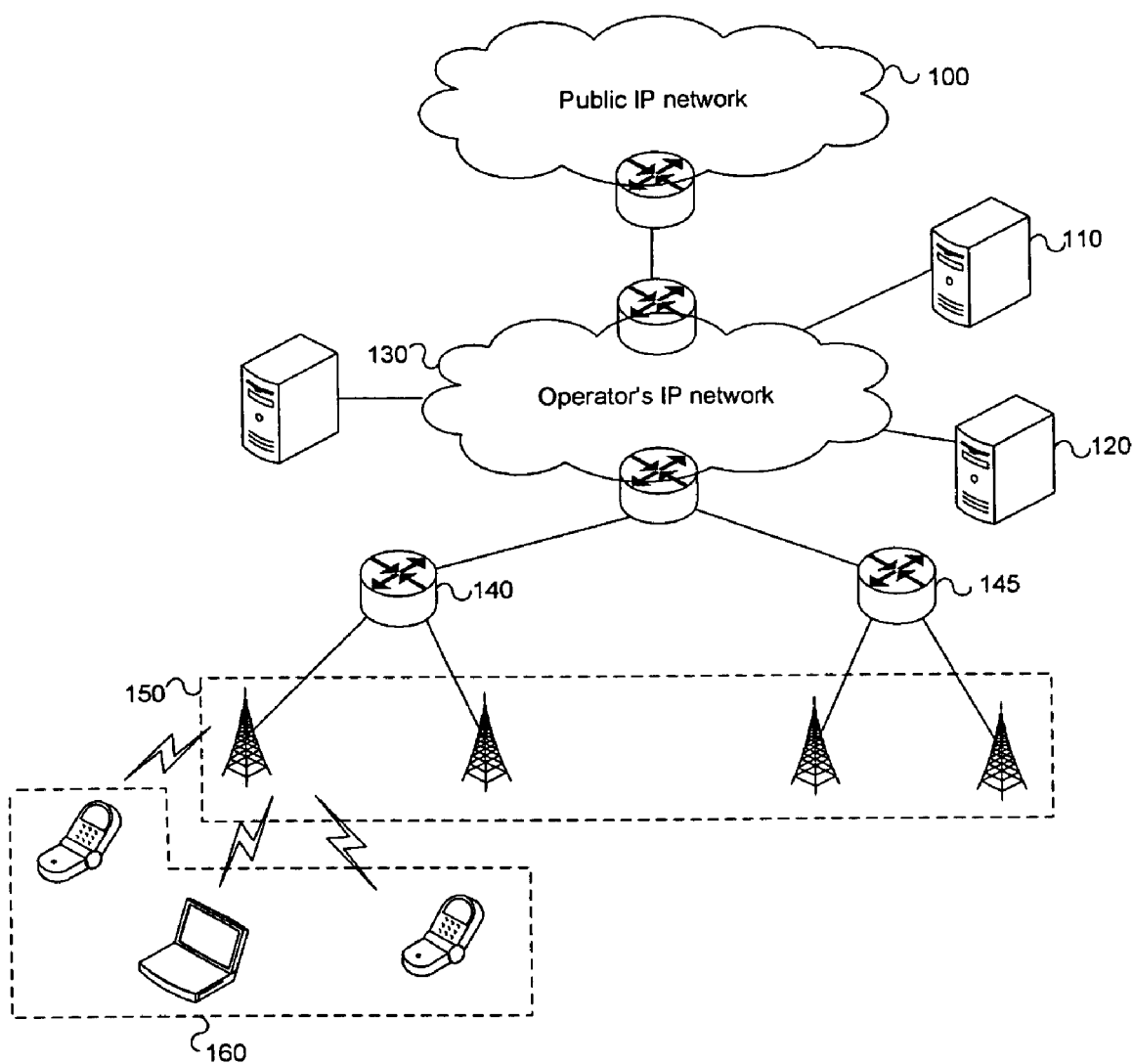
FIG. 1 is a schematic structure of a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

An apparatus for performing accounting for a mobile station in a portable Internet system and a method thereof according to an exemplary embodiment of the present invention will be described in further detail.

FIG. 1 is a schematic diagram of a mobile communication system according to an exemplary embodiment of the present invention.

As shown in FIG. 1, a system according to the exemplary embodiment of the present invention includes a mobile terminal 160, a base station 150, and routers 140 and 145. The base station includes a parameter measuring device 170 for performing an accounting operation, and the mobile terminal 160, the base station 150, and the routers 140 and 145 are connected to a public IP network 100. Therefore, without changing a structure of a typical portable Internet system, an accounting operation can be performed based on the amount of radio resources and the amount of traffic services used by a mobile terminal according to the exemplary embodiment of the present invention.

A plurality of mobile terminals can access one base station 150 and communicate with the base station 150, and the base station 150 is connected to one operator's IP network 130. Therefore, a subscriber of a mobile terminal 160 must access the public IP network 100 through the base station 150 and the operator's IP network 130 so as to use IP-based services using the mobile terminal 160. The operator's IP network 130 is connected with a home agent (HA) server 110, an authentication service authorization (ASA) server, and an authentication, authorization, and accounting (AAA) server 120.

The HA server 110 supports mobility of a plurality of mobile terminals 160 by processing mobile IP address information and packet routing of the mobile terminal 160 that accesses the HA server 110 through an IP network. The AAA server 120 processes authentication, authorization, and accounting of the mobile terminal 160 that accesses the AAA server 120 through the IP network. The processes of the HA server 110 and the AAA server 120 are well know to the person skilled in the art, and therefore, further descriptions will be omitted.

In the system configured with the above-described constituent elements, the base station 150 can measure the amount of radio resources and the amount of traffic services used by a mobile terminal 160 accessing the base station 150. When data transmission between the base station 150 and the mobile terminal 160 fails, retransmission of traffic that is the same as previous traffic may be required.

Therefore, according to the exemplary embodiment of the present invention, the amount of radio resources used by the mobile terminal 160, the amount of traffic services used by the mobile terminal 160, and the amount of traffic use due to retransmission will be separately described, and an accounting operation can be performed on the basis of the three cases.

A structure of the transmission frame transmitted between the mobile terminal 160 and the base station 150 of FIG. 1 will be described with reference to FIG. 2. The base station 150 can measure the amount of radio resource used by the mobile terminal 160 based on the transmission frame of FIG. 2.

Figure 2:
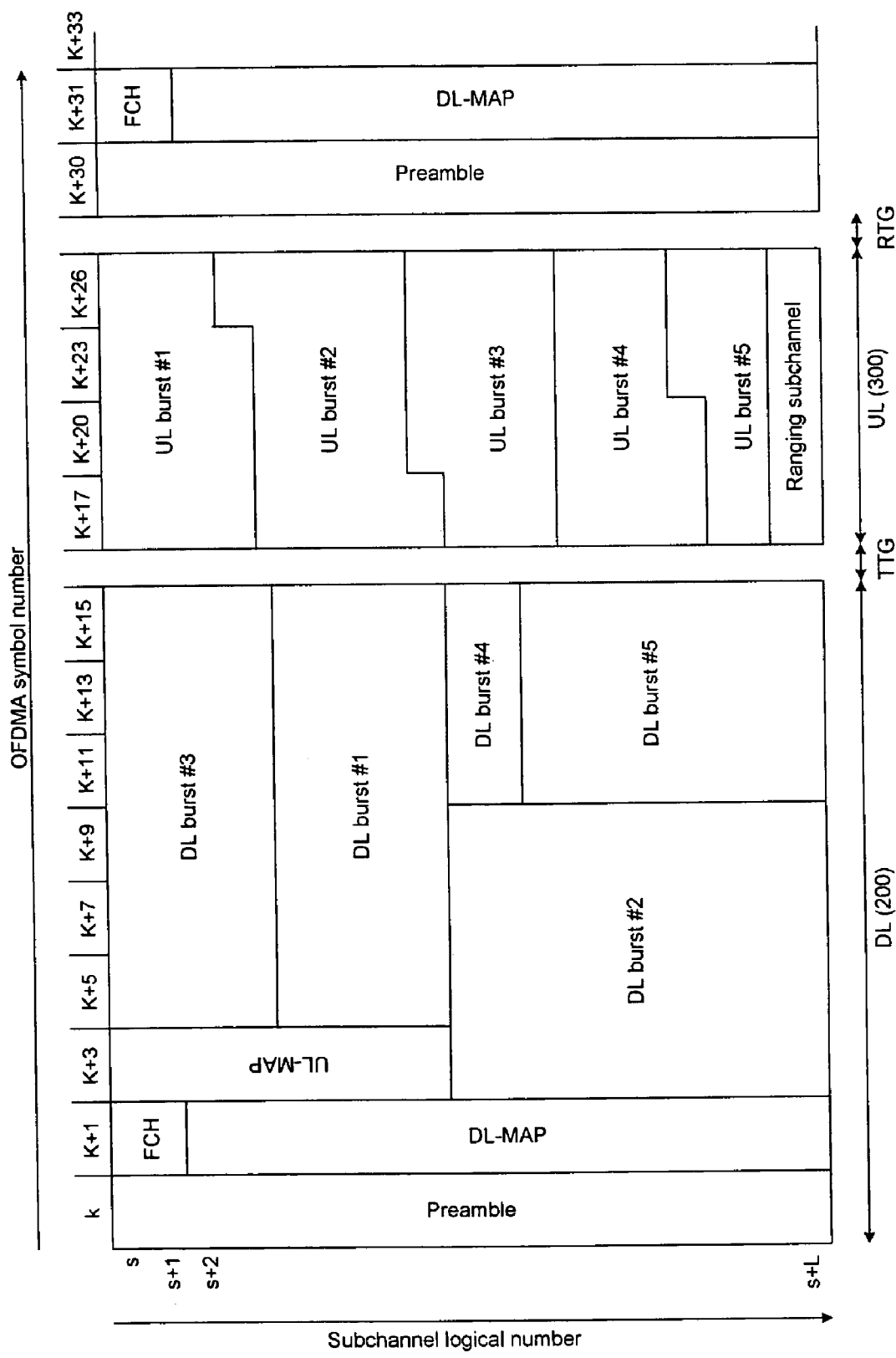
FIG. 2 is a configuration diagram of a transmission frame according to the exemplary embodiment of the present invention.

FIG. 2 is a schematic diagram of the transmission frame according to the exemplary embodiment of the present invention.

As shown in FIG. 2, the transmission frame is divided into a downlink (DL) frame 200 transmitted to the mobile terminal 160 from the base station 150 and an uplink (UL) frame 300 transmitted to the base station 150 from the mobile terminal 160. The Y axis of the frame denotes sub-channels formed of orthogonal frequencies and the X axis denotes a time-divided time axis.

The DL frame 200 includes a preamble, a DL MAP, an UL MAP, and a plurality of DL bursts. Herein, the DL burst is a channel or resource not classified for each subscriber but classified for a transmission level having the same modulation scheme or channel skill. The DL MAP identifies the mobile terminal 160 by using a connection identifier (CID), and the base station 150 allocates resources to the mobile terminal 160 by using offset information, a modulation scheme, and a coding scheme that correspond to the identified mobile terminal 160.

Therefore, the DL MAP and the UL MAP are used for transmission of a location of a burst located for each subscriber and commonly broadcasted information to mobile terminals 160 of all subscribers within a DL/UL transmission frame. For this reason, the DL MAP has a similar characteristic to a broadcasting channel, and requires high robustness.

The uplink frame 300 performs subscriber-specific transmission and a plurality of UL bursts respectively include information on a mobile terminal 160 of each user. In addition, the UL frame includes a ranging sub-channel used for periodically reporting the status of the mobile terminal 160 to the base station 150.

A plurality of bursts included in the DL frame 200 may be respectively formed for each subscriber, and a control message and traffic information are transmitted to each subscriber through the respective bursts. All mobile terminals located in the base station 150 can receive the DL/UL MAPs.

In the transmission frame of FIG. 2, the DL frame 200 is information formed by the base station 150 and transmitted to the mobile terminal 160, and the UL frame 300 is information formed by the mobile terminal 160 and transmitted to the base station 150 by using UL MAP information included in a part of the DL frame 200. Therefore, the base station 150 can know the configuration of the transmission frame in advance.

As described, when the base station 150 knows the structure of the transmission frame in advance, the amount of radio resource used by each mobile station 160 can be measured per transmission frame. That is, the base station 150 can measure the amount of radio resources used by a specific mobile terminal per each frame by using information on a structure of a transmission frame of which the base station 150 is already aware.

The mobile terminal 160 within the base station 150 uses a radio resource for each slot per frame. Herein, the slot is a basic unit of radio resource allocation, represented by a product of a subchannel and a symbol, and the size of a bandwidth used for UL/DL transmission between the base station 150 and the mobile terminal 160 can be represented by the slot. Therefore, the base station 150 calculates the number of slots used by the mobile terminal 160 accessing the base station 150 for UL/DL transmission for each transmission frame so as to measure the amount of radio resources used by each mobile terminal 160 for each frame.

A MAP information structure included in a transmission frame structure used for estimating the amount of traffic used by the mobile terminal 160 will be described in further detail with reference to FIG. 3.

Figure 3:
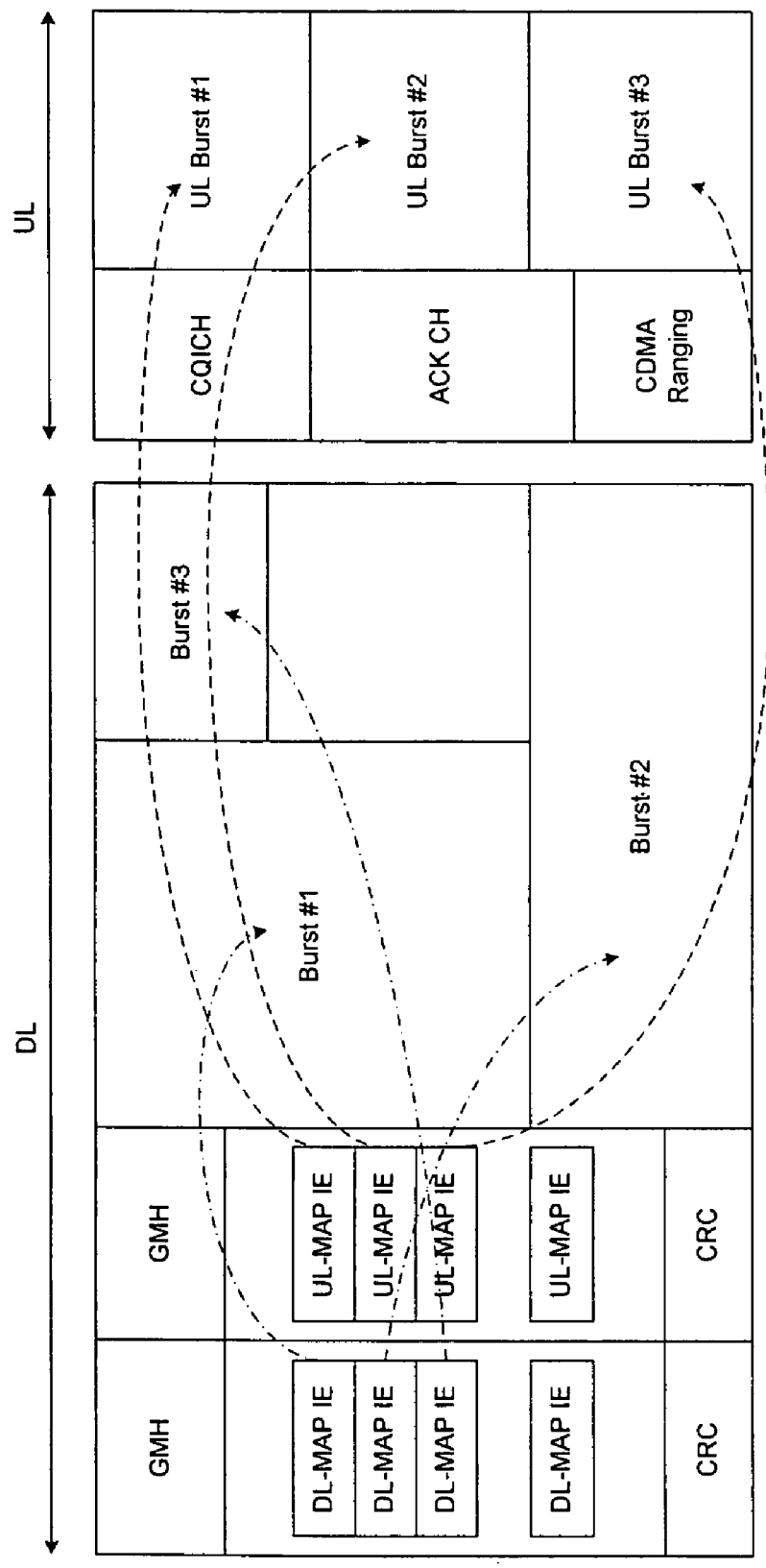
FIG. 3 is a detailed configuration diagram of a MAP IE in the transmission frame according to the exemplary embodiment of the present invention.

FIG. 3 is a configuration diagram of a MAP information element in the transmission frame according to the exemplary embodiment of the present invention.

As shown in FIG. 3, a MAP in the transmission frame is divided into a downlink MAP for downlink transmission and an uplink MAP for uplink transmission, and the downlink MAP and the unlink MAP are respectively formed of a plurality of downlink MAP information elements (IEs) and a plurality of uplink MAP IEs.

The plurality of mobile terminals 160 receive downlink/uplink MAPs included in a DL frame of the transmission frame structure of FIG. 2, obtain broadcasting information and burst information allocated to the corresponding mobile terminal, and perform downlink/uplink communication based on the obtained information. Herein, the downlink/uplink MAP IE is information generated by the base station 150 and transmitted to the mobile terminal 160. Therefore, the base station 150 knows MAP IE information transmitted to each mobile station 160 accessing the base station 150.

The base station 150 and each of the mobile stations 160 perform uplink/downlink communication with each other by using a different modulation/demodulation scheme for each frame. When an adaptive modulation coding (AMC) scheme is used, the mobile station 160 changes a modulation/demodulation scheme according to a channel condition of a location at which the mobile terminal 160 is located and performs communication with the base station 150. The AMC scheme can be divided into a plurality of levels for supporting uplink/downlink communication at a higher transmission rate. The plurality of levels will be referred to as AMC levels. Herein, the AMC level provides information on a modulation and channel coding scheme used for transmission of a specific slot.

A DL/UL MAP IE generated by the base station 150 and transmitted to the mobile terminal 160 includes information on which AMC level is used by the mobile terminal 160 for UL/DL transmission per frame. Therefore, the base station 150 can know which AMC level is used by each mobile terminal 160 for uplink/downlink transmission per frame when the base station 150 knows the DL/UL MAP IE information.

The amount of traffic used by each mobile terminal 160 per frame transmission is obtained by using information on the AMC level and the number of slots used per frame by each mobile terminal 160. Herein, the information on the AMC level and the number of slots have been obtained by using the radio resource use amount measuring process of FIG. 2. That is, a data rate that can be a reference for measuring the amount of information that can be transmitted by a specific number of slots can be analyzed based on the AMC level information, and the data rate becomes a reference of a traffic use amount.

A method for retransmission in a receiving side and a transmitting side in the case that data transmission/receiving between the base station 140 and the mobile terminal 160 fails and thus retransmission of traffic that is the same as the previously transmitted traffic is required will be described with reference to FIG. 4A and FIG. 4B. The base station 150 can measure a retransmission traffic use amount for the mobile terminal 160 through the processes of FIG. 4A and FIG. 4B.

Figure 4A:
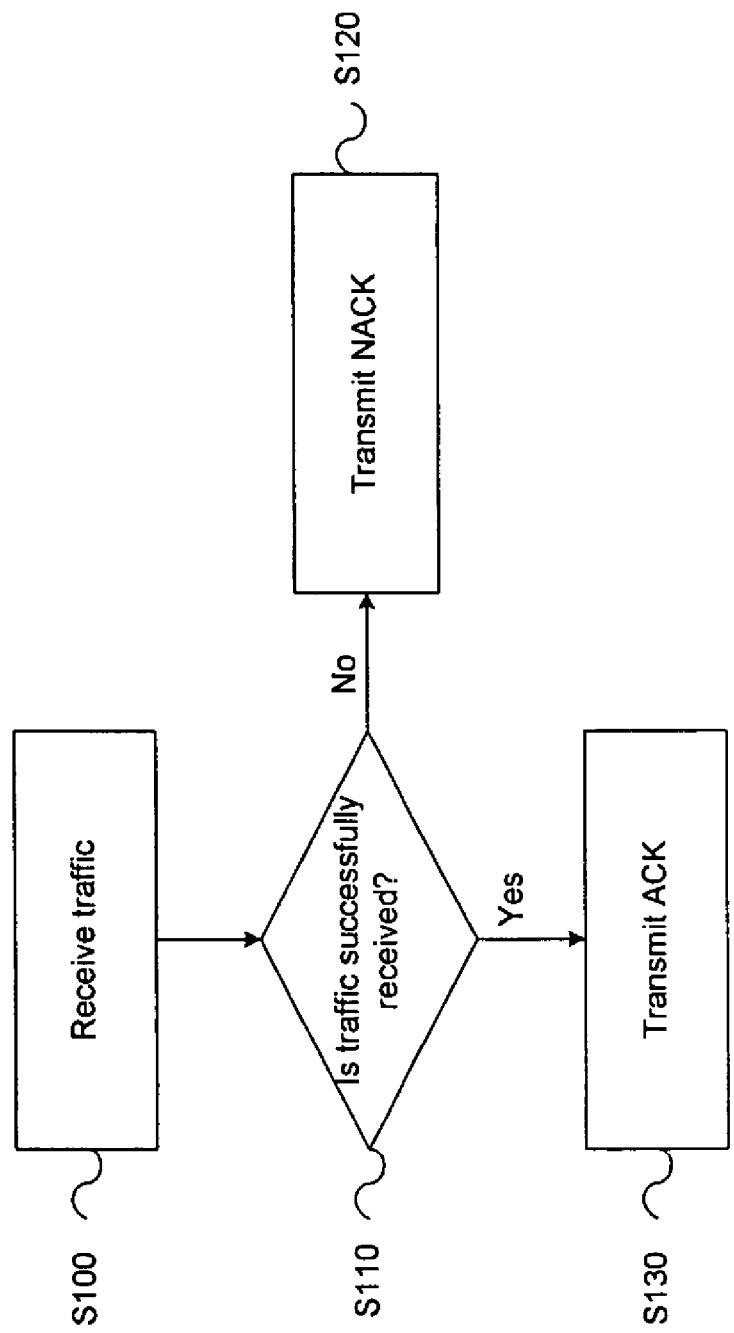
FIG. 4A is an operation flowchart of a retransmission process of a receiving side according to the exemplary embodiment of the present invention.
Figure 4B:
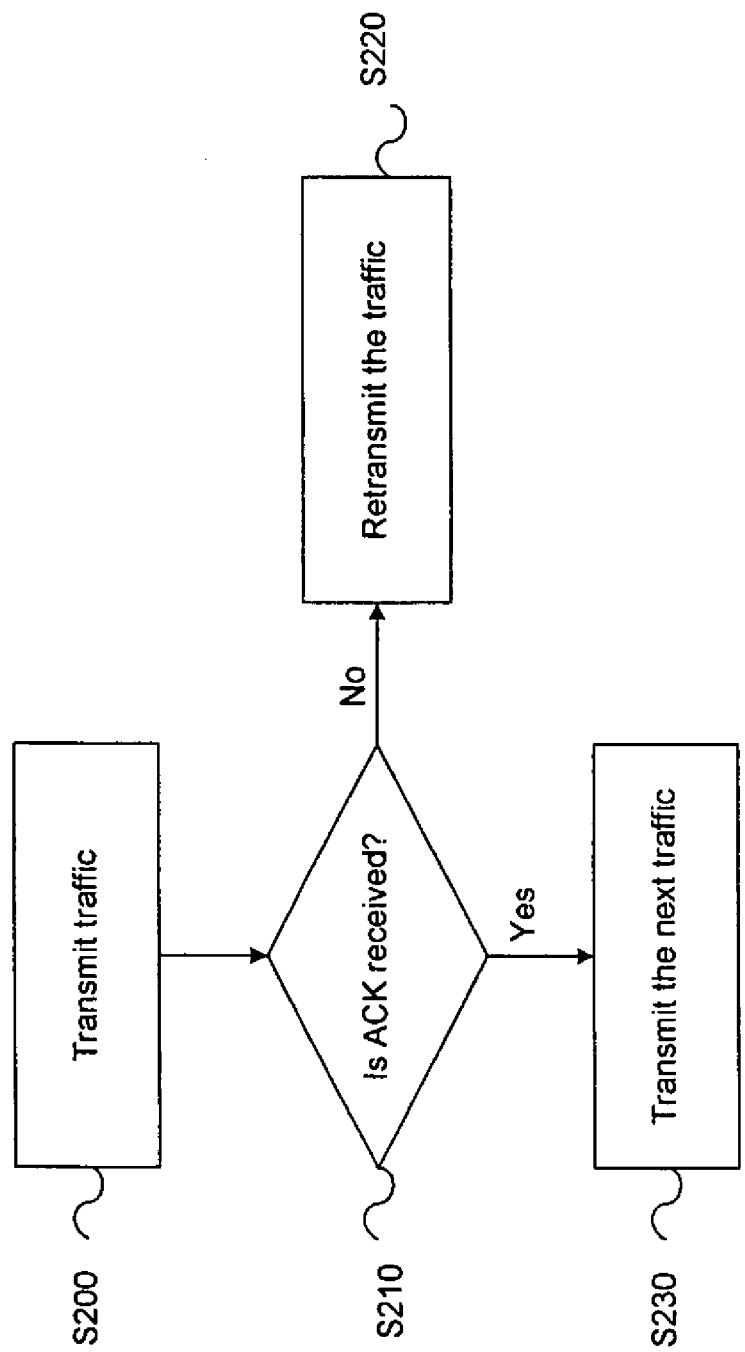
FIG. 4B is an operation flowchart of a retransmission process of a transmitting side according to the exemplary embodiment of the present invention.

FIG. 4A is an operation flowchart for a receiving-side retransmission process according to the exemplary embodiment of the present invention, and FIG. 4B is an operation flowchart of a transmitting-side retransmission process according to the exemplary embodiment of the present invention.

As shown in FIG. 4A and FIG. 4B, downlink retransmission is transmission of traffic from the base station 150 to the mobile terminal 160, and therefore the retransmission occurs in the base station 150. On the contrary, uplink retransmission is transmission of traffic from the mobile terminal 160 to the base station, and therefore the retransmission occurs in the mobile station 160.

As shown in FIG. 4A, either the base station 150 or the mobile terminal 160 receives traffic transmitted from a transmitting side in step S100, and determines whether the traffic is successfully received in step S110. When the traffic has been successfully received, an ACK message is transmitted to the transmitting side in step S130, responding to the successful receiving of the traffic, and a NACK message is transmitted to the transmitting side when the traffic has not been successfully transmitted in step S120.

As shown in FIG. 4B, after a transmitting side transmits traffic to a receiving side of the transmitting side in step S200, the transmitting side determines whether an ACK message is received from the receiving side, responding to the traffic, in step S210. When receiving the ACK message, the transmitting side transmits the next traffic to the receiving side in step S230, and when receiving a NACK message, the transmitting side re-transmits the failed traffic, in step S220.

As described, when retransmission occurs between the base station 150 and the mobile terminal 160, a traffic use amount is calculated with reference to a traffic transmission rate based on the number of slots and an AMC level. Accordingly, the base station 150 analyzes the number of retransmissions occurring due to receiving a NACK message from the mobile terminal 160 and the number of retransmission requests sent to the mobile terminal 160 by the transmission of a NACK signal to the mobile terminal 160, so that the base station 150 can analyze the amount of traffic generated due to frame retransmission. That is, assuming that an uplink retransmission traffic use amount is $RTr_{UL}$ and a downlink retransmission traffic use amount is $RTr_{DL}$, Equation 1 is established.

$$RTr_{UL} = N_{NACK\_Tx} \times R_{UL}$$

$$RTr_{DL} = N_{NACK\_Rx} \times R_{DL} \quad \text{[Equation 1]}$$

Wherein:

$N_{NACK\_Tx}$ is the number of NACK transmissions of a base station after receiving the corresponding unlink traffic;

$N_{NACK\_Rx}$ is the number of received NACKs of a base station after transmitting the corresponding downlink traffic;

$R_{UL}$ is a data rate of retransmitted traffic for the corresponding uplink of a mobile station; and $R_{DL}$ is a data rate of retransmitted traffic for the corresponding downlink of a mobile station.

The retransmission traffic use amount $RTr_{user}$ can be acquired by calculating an $RTr_{user}$ value and an $RTr_{DL}$ value for all retransmitted traffic, and then adding the $RTr_{user}$ values and the $RTr_{DL}$ values.

Therefore, accounting of a subscriber can be calculated by using the radio resource use amount and the traffic use amount measured with reference to FIG. 2 and FIG. 3 and the retransmission traffic use amount described through the processes of FIG. 4A and FIG. 4B. The parameter measuring device 170 for accounting calculation according to the exemplary embodiment of the present invention will now be described with reference to FIG. 5. Herein, the parameter implies the amount of radio resources, the amount of traffic, and the amount of retransmissions required for accounting amount calculation.

Figure 5:
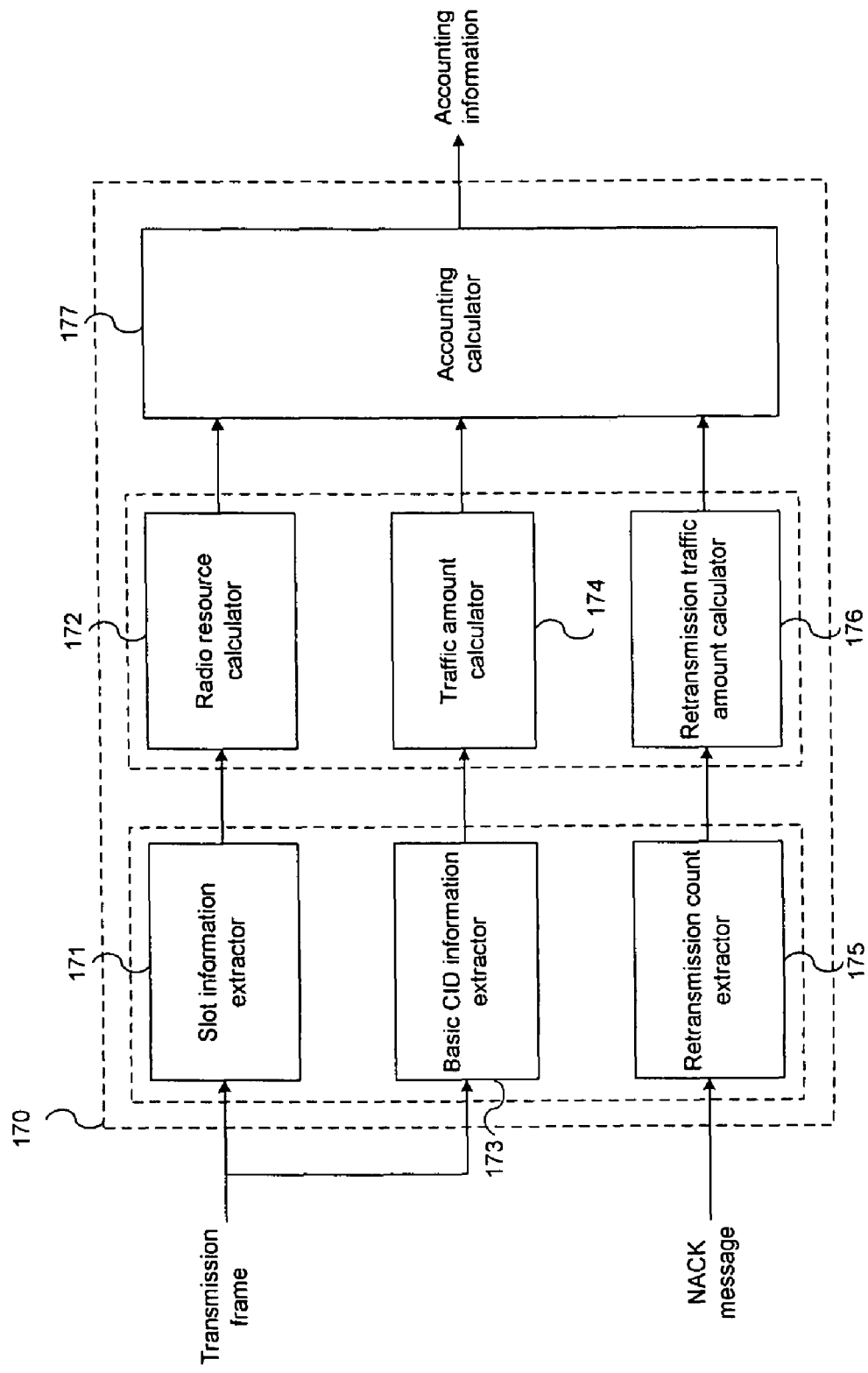
FIG. 5 is a configuration diagram of an accounting apparatus according to the exemplary embodiment of the present invention.

FIG. 5 is a configuration diagram of an accounting apparatus according to the exemplary embodiment of the present invention.

As shown in FIG. 5, the accounting apparatus according to the exemplary embodiment of the present invention includes a slot information extractor 171, a basic CID information extractor 173, a retransmission count extractor 175, a radio resource amount calculator 172, a traffic amount calculator 174, a retransmission traffic amount calculator 176, and an accounting calculator 177. Herein, the slot information extractor 171, the basic CID information extractor 173, and the retransmission count extractor 175 may be grouped as a parameter information extractor. In addition, the radio resource amount calculator 172, the traffic amount calculator 174, and the retransmission traffic amount calculator 176 may be grouped as a parameter information calculator.

The slot information extractor 171 extracts the number of slots allocated to a downlink or an uplink of the mobile terminal 150 based on input information on a transmission frame structure or information on a frame structure that the mobile terminal 150 already knows. The extracted number of slots becomes a reference for measuring the amount of radio resources. In this case, the number of slots is included in mobile terminal ID information.

The basic CID information extractor 173 extracts information on a mobile terminal ID allocated to a mobile terminal accessing the base station 150 based on input information on a transmission frame structure or information on a transmission frame structure that has been already known to the base station 150 from the slot information extractor 171. Herein, the mobile terminal identifier information will be exemplarily described as basic CID information. The basic CID information includes the number of downlink/uplink slots and an AMC level of a downlink/uplink slot and a traffic use amount is calculated based on the extracted number of slots and the AMC level information.

The retransmission count extractor 175 extracts the number of retransmissions based on information on a NACK message transmitted to a transmitting side when a receiving side cannot successfully receive traffic. Herein, the mobile terminal 160 becomes the receiving side in the case of downlink transmission/receiving, and the base station 150 becomes the receiving side in the case of uplink transmission/receiving. A retransmission traffic use amount is calculated based on the extracted number of retransmissions. In this case, the number of retransmissions may correspond to the number of NACK messages received by the base station 150 from the mobile station 160.

The radio resource amount calculator 172 calculates the amount of radio resources used by the mobile terminal 160 accessing the base station 150 based on the number of slots extracted by the slot information extractor 171 and outputs a calculation result. The radio resource use amount is calculated based on the number of uplink/downlink slots allocated to each mobile terminal 160 per frame, and the number of slots can be used in this calculation since it is used to represent the size of a band.

The traffic amount calculator 174 calculates the amount of traffic used by the mobile terminal 160 accessing the base station 150 based on the number of slots and the AMC level information extracted by the basic CID information extractor 173.

The retransmission traffic amount calculator 176 calculates the amount of traffic transmitted from the transmitting side according to the number of retransmission requests of the receiving side based on the traffic retransmission number information extracted by the retransmission number extractor 174. Herein, the retransmission traffic amount is acquired by calculating $RTr_{UL}$ values and $RTr_{DL}$ values for all traffic retransmission, and then adding the $RTr_{UL}$ values and the $RTr_{DL}$ values.

The accounting calculator 177 receives a radio resource use amount, a traffic use amount, and a retransmission traffic amount of a specific subscriber, calculated by the radio resource amount calculator 172, the traffic amount calculator 174, and the retransmission traffic amount calculator 176, calculates weighted accounting for the subscriber, and outputs an accounting result.

A weighted accounting measure according to the exemplary embodiment of the present invention can be obtained as given in Equation 2.

$$ACNT_{ref\_user} = W_{RS} \times RSRCE_{user} + W_{Tr} \times \text{Traffic}_{user} + W_{RTr} \times RTr_{user}$$ [Equation 2]

Herein:

$ACNT_{ref\_user}$ is an accounting measure for one subscriber;

$RSRCE_{user}$ is a radio resource use amount of one subscriber;

$\text{Traffic}_{user}$ is a traffic use amount of one subscriber;

$RTr_{user}$ is a retransmission traffic amount of one subscriber; and $W_{RS}$, $W_{Tr}$, and $W_{RTr}$ are weight values.

As described, a network provider allocates a weight to an important part so as to generate a final measure required for accounting and uses the measure for calculating accounting of each user.

A method for measuring parameters for accounting calculation by using the accounting apparatus of FIG. 5 and calculating accounting based on the measured parameters will be described with reference to FIG. 6.

Figure 6:
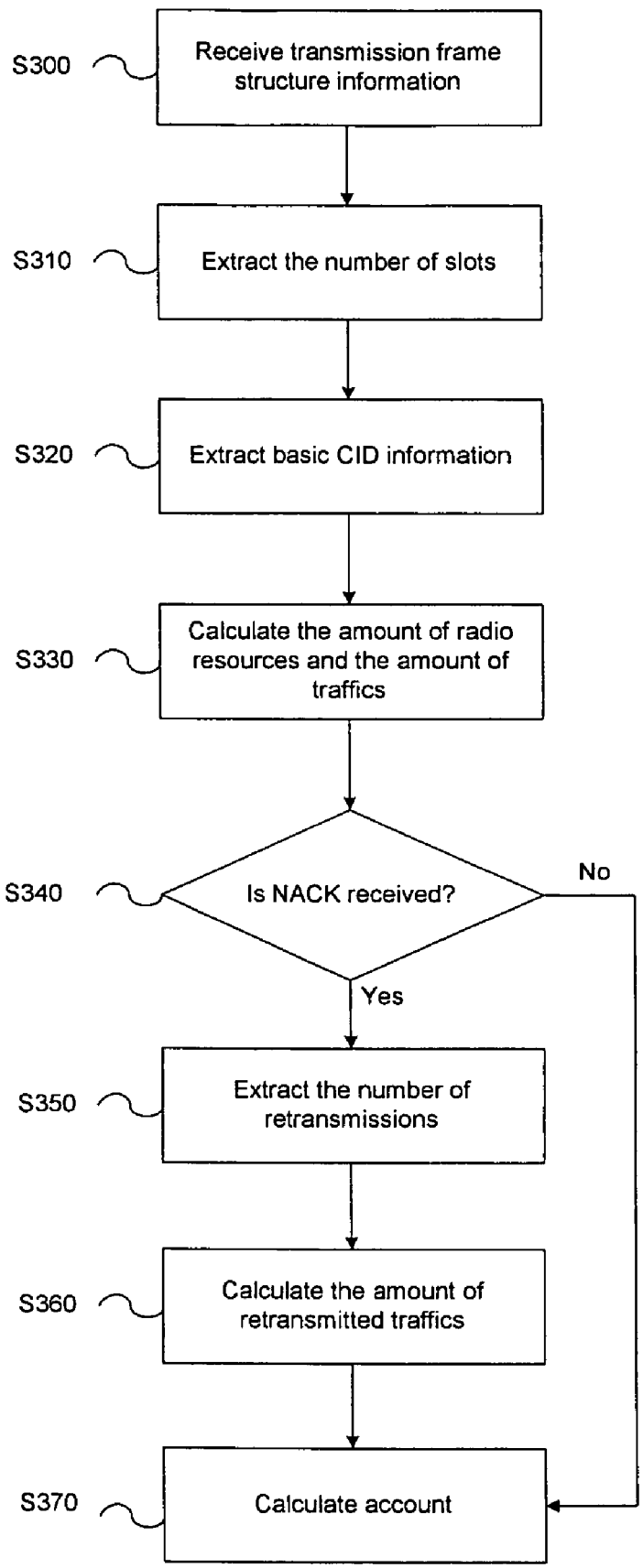
FIG. 6 is a flowchart of an accounting operation process according to the exemplary embodiment of the present invention.

FIG. 6 is a flowchart of an accounting calculation process according to the exemplary embodiment of the present invention.

As shown in FIG. 6, the accounting apparatus receives information on a transmission frame structure of which the base station 150 is already aware, in step S300. When receiving the transmission frame structure information, the slot information extractor 171 and the basic CID information extractor 173 respectively extract basic CID information including the number of slots allocated to a mobile terminal 160 accessing the base station 150 in steps S310 and S320, and calculate a radio resource use amount and a traffic resource use amount by accessing the base station 150 based on the extracted basic CID information, in step S330. While the radio resource use amount and the traffic resource use amount are calculated, the base station 150 determines whether a NACK message is transmitted to the mobile terminal 160 by the base station 150 or whether a NACK message is received from the mobile terminal 160, in step S340.

When the base station 150 and the mobile terminal 160 successfully transmit/receive traffic, no NACK message is transmitted/received, and therefore the accounting calculator 177 calculates accounting by using the radio resource use amount and the traffic use amount calculated in step S330.

However, when the base station 150 transmits/receives a NACK message, the retransmission count extractor 175 extracts the number of NACK message transmissions, that is, the number of retransmissions, in step S350, and the retransmission traffic amount calculator 176 calculates a retransmission traffic amount based on the extracted retransmission number, in step S360. The accounting calculator 177 accesses the base station 150 and calculates accounting for resources used by the mobile terminal 160 based on the radio resource use amount, the traffic use amount, and the retransmission traffic use amount, in step S370.

A program realizing a function corresponding to a configuration of the exemplary embodiment of the present invention, and a recoding medium storing the program are also included within the scope of the present invention.

According to the above-described exemplary embodiment, the amount of radio resources and the amount of traffic used by a mobile terminal of each subscriber accessing a base station can be measured and analyzed without changing configuration of the mobile communication system.

In addition, accounting of a subscriber is calculated based on the radio resource amount and the traffic amount, and therefore accounting of the subscriber can be easily calculated.

In addition, since a provider who does not own an IP network and thus uses a leased network of an existing provider can measure and analyze the amount of traffic used by a mobile terminal in the leased network regardless of an IP network of the existing provider, a more precise accounting reference can be provided to the corresponding provider.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for calculating accounting of a mobile terminal of a subscriber accessing a base station, the apparatus comprising:
   a parameter information extractor for extracting parameter information for the accounting, comprising:
      a slot information extractor for extracting as first parameter information a number of slots allocated to the mobile terminal from a transmission frame transmitted to the mobile terminal, the number of slots included in mobile terminal identifier (ID) information of the mobile terminal;
      a mobile terminal ID information extractor for receiving a downlink broadcast from the base station, and extracting as second parameter information an amount of traffic of the mobile terminal based on the mobile terminal ID information of a downlink MAP information element and an uplink MAP information element included in the downlink; and
      a retransmission number extractor for extracting as third parameter information a number of retransmissions of traffic to the mobile terminal based on a NACK message received from the mobile terminal;
   a parameter information calculator for calculating an amount of information for each parameter information; and
   an accounting calculator for calculating accounting for an amount of traffic used by the mobile terminal accessing the base station, based on the calculated amount of information for each parameter information.

2. The apparatus of claim 1, wherein the parameter information calculator comprises:
   a radio resource amount calculator for calculating the amount of radio resources used in the base station by the mobile terminal based on the extracted number of slots;
   a traffic amount calculator for calculating the amount of traffic for the mobile terminal based on the extracted mobile terminal ID information; and
   a retransmission traffic amount calculator for calculating the amount of traffic used for retransmission of the traffic based on the extracted number of retransmissions of the traffic to the mobile terminal, the amount of retransmission traffic being calculated by adding an uplink retransmission traffic use amount and a downlink retransmission traffic use amount.

3. The apparatus of claim 2, wherein the uplink retransmission traffic use amount is calculated by multiplying the number of NACK message transmissions to the mobile terminal by a transmission rate of the uplink retransmission traffic from the mobile terminal after the base station receives the uplink traffic, and the downlink retransmission traffic use amount is calculated by multiplying the number of NACK messages received from the mobile terminal by a transmission rate of the downlink retransmission traffic of the mobile terminal after the base station transmits the downlink traffic.

4. The apparatus of claim 3, wherein the mobile terminal ID Information includes basic connection identifier (CID) information, the CID information including the number of downlink/uplink slots allocated to a basic CID and an adaptive modulation coding (AMC) level of an uplink/downlink slot.

5. The apparatus of claim 2, wherein the accounting calculator Calculates accounting based on the following equation:

$$ACNT_{ref\_user} = W_{RS} \times RSRCE_{user} + W_{Tr} \times \text{Traffic}_{user} + W_{RTr} \times RTr_{user}$$

(where $ACNT_{ref\_user}$ denotes a mobile terminal accounting measure, $RSRCE_{user}$ denotes the amount of radio resources, $\text{Traffic}_{user}$ denotes the amount of traffic, $RTr_{user}$ denotes the amount of retransmission traffic, and $W_{RS}$, $W_{Tr}$, and $W_{RTr}$ denote random weight values).

6. The apparatus of claim 1, wherein the parameter information comprises the number of slots, AMC level information, and the number of traffic retransmissions.

7. A method for calculating accounting of a mobile terminal of a subscriber in a base station, the method comprising:
   measuring as a first parameter an amount of radio resources and as a second parameter an amount of traffic allocated to the mobile terminal accessing the base station based on transmission frame structure information transmitted to the mobile terminal,
   measuring a retransmission traffic amount as a third parameter based on a NACK message received from the mobile terminal or transmitted to the mobile terminal; and
   calculating accounting for resources used by the mobile terminal accessing the base station based on the first parameter, the second parameter and the third parameter,
   wherein the first parameter and the second parameter is measured based on mobile terminal identifier (ID) information of the mobile terminal;
   wherein the mobile terminal ID information corresponds to basic connection ID (CID) information, the basic CID information including the number of uplink/downlink slots and an adaptive modulation coding (AMC) level of a downlink/uplink slot; and
   wherein the basic CID is included in information elements of a downlink MAP and an uplink MAP that are broadcasting information included in a downlink broadcast from the base station.

8. The method of claim 7, wherein the calculating of the accounting billing is performed based on the following equation:

$$ACNT_{ref\_user} = W_{RS} \times RSRCE_{user} + W_{Tr} \times \text{Traffic}_{user} + W_{RTr} \times RTr_{user}$$

(where $ACNT_{ref\_user}$ denotes a mobile terminal accounting measure, $RSRCE_{user}$ denotes the amount fo radio resources, $\text{Traffic}_{user}$ denotes the amount of traffic, $RTr_{user}$ denotes the amount of retransmission traffic, and $W_{RS}$, $W_{Tr}$, and $W_{RTr}$ denote random weight values).

* * * * *